United States Patent

McCoy et al.

[15] 3,665,422

[45] May 23, 1972

[54] INTEGRATED CIRCUIT, RANDOM ACCESS MEMORY

[72] Inventors: Michael R. McCoy, San Jose; Terry R. Walther, Sunnyvale, both of Calif.

[73] Assignee: Electronic Arrays Inc., Mountain View, Calif.

[22] Filed: Jan. 26, 1970

[21] Appl. No.: 5,575

[52] U.S. Cl. ..........................340/173 R, 307/238, 307/279
[51] Int. Cl. ....................................G11c 11/40, H03k 3/26
[58] Field of Search .....................340/173 FF; 307/238, 279

[56] References Cited

UNITED STATES PATENTS 3,506,851 4/1970 Polkinghorn ..........................340/173
3,355,721 11/1967 Burns....................................340/173

*Primary Examiner*—Terrell W. Fears
*Attorney*—Smyth, Roston & Pavitt

[57] ABSTRACT

An integrated circuit MOS type memory is disclosed operating with two phases and minimum component cells. The cells are respectively located at intersections of a pair of two phase operated addressing lines and of a set of data write and read lines synchronously operated with addressing. Read addressing of cells in controlled concurrently with address decoding; write addressing of memory cells is dependent upon preceding read addressing of the same cells and concurs with preparation for the next addressing operation. Memory read lines are kept at floating potential prior to reading addressed cells which control the respective read lines to obtain node discharge or no-discharge in refresher amplifiers. Refresh write operations are controlled during the respective next write phase in dependence upon the charge contents of the nodes in the refresher amplifiers.

23 Claims, 1 Drawing Figure

PATENTED MAY 23 1972 3,665,422
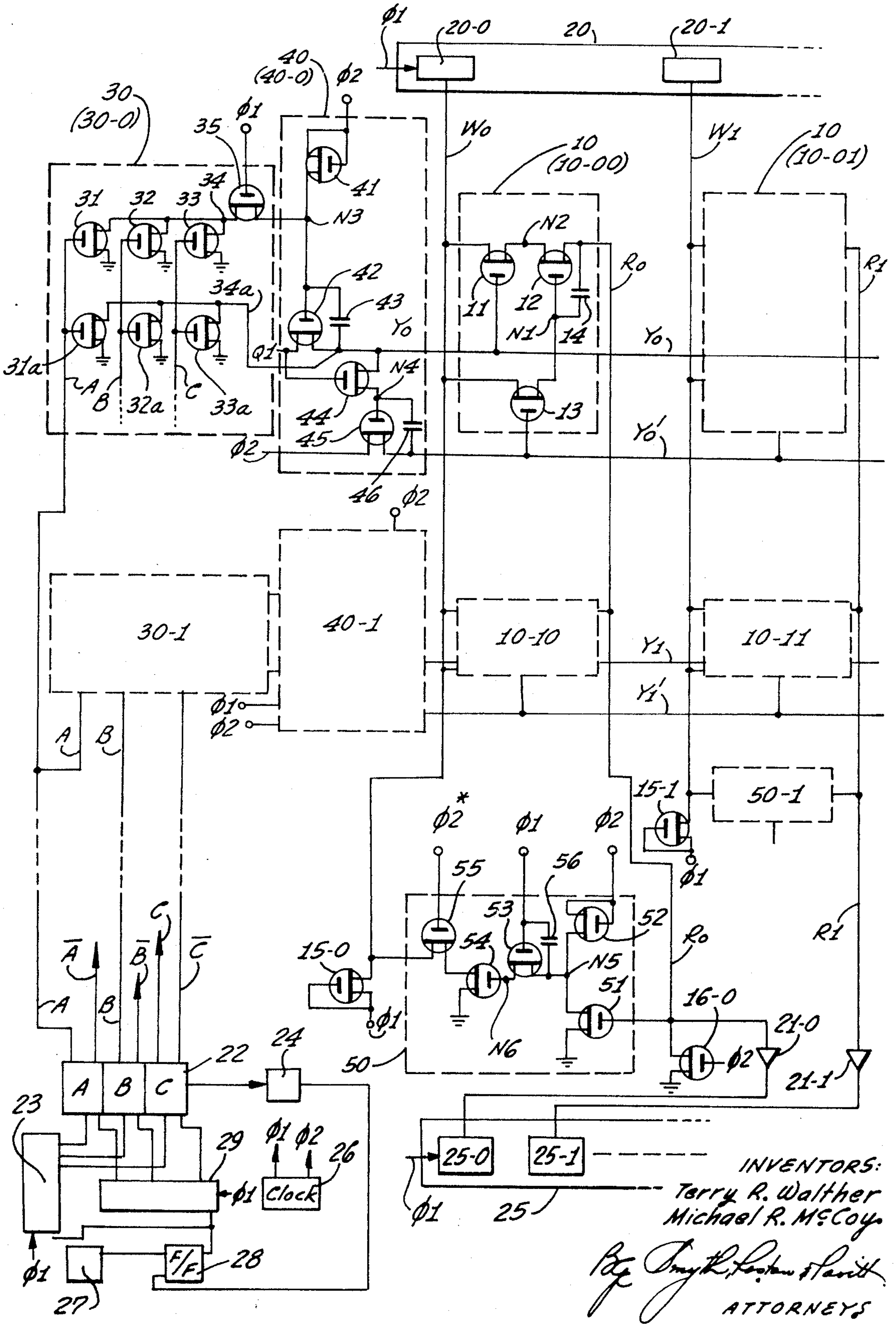
INVENTORS:
Terry R. Walther
Michael R. McCoy
By Smyth, Roston & Pavitt
ATTORNEYS

INTEGRATED CIRCUIT, RANDOM ACCESS MEMORY

The present invention relates to improvements in random access digital data memories, and more particularly to improvements of integrated circuit memories or memory arrays. Presently a competitive effort is under way to develop, on one hand, improved and more economical random access memories with magnetic storage elements, essentially as an outgrowth of the well-known ferrite core-type memories. On the other hand, integrated circuit techniques have been and are being developed, generally using semi-conductor material and designed also to operate as random access memory. For reasons of economics it was found to be of advantage to employ microelectronic structure in which the active elements are insulated gate field effect transistors interconnected to establish an array of digital data memory cells. The gate insulation is commonly established by an oxide layer, so that the active elements are sometimes designated metal-oxide-semiconductor, insulated gate field effect transistors.

These types of transistors are established in an integrated circuit chip together with a particular connection pattern. As a consequence, there will appear particular regions (nodes) in the chip which can be isolated from, for example, the reference potential (ground) as usually applied to the substrate of the ship, so that they can hold electric charges, and operate in effect as capacitors. In particular, the capacitance between a gate and the main electrodes of an MOS transistor in the chip constitutes such a node. Such a capacitance is used to store a charge relative to ground which charge or absence thereof is given digital significance.

This type of integrated circuit memory has the inherent disadvantage over a memory which uses permanent magnetism for storing digital information in particular locations, as permanent magnetism can be maintained localized more or less indefinitely (without current consumption), whereas such a capacitive charge leaks off and, therefore, has to be replenished and "refreshed." Successful employment of an integrated circuit memory as high access speed-type memory, therefore, depends to a considerable extent on the obtainable operating speed, particularly as far as repetition of the "refreshing" operation is concerned, because during periods when the digital content of a memory cell is being refreshed, the memory or at least the portion thereof undergoing content refreshing is not accessible to external devices seeking communication with the memory.

It is a particular feature of the present invention that the memory address decoding and memory read, memory write and/or memory write-refresh operations are carried out within one memory cycle established by two sequential alternating phase signals, and in synchronism therewith. The memory in accordance with the invention considers to the full extent possible, that integrated MOS circuits are essentially constituted of storage nodes which are charged, discharged or whose charge is copied into other nodes.

By appropriate design, it is possible to operate such system with two phases throughout. The two phase signals pertain respectively to two trains of alternating or interspaced phase signals or pulses. Memory operation requires address decoding and location accessing. The decode operation,preparatory to accessing a memory location to the word level, is carried out in synchronism with a first phase signal of a pair of two such phase signals, during which first phase there is also memory readout proper of the addressed memory locations to the bit level. Additionally, that particular first phase is used to prepare the memory circuit for the following memory write or write-refresh cycle.

During the write-refresh cycle, in accordance with that second phase, the same memory location to the word level is write-addressed for replenishing the main storage nodes of the several locations to the bit level and in accordance with their contents read previously from them. Additionally, and in the alternative, new contents can be set into the cells as a new charge state of the nodes pursuant to a memory write operation. It is an feature of the memory design that during write or write-refresh phases the decoder circuit as well as the entire memory is prepared for the next decoding and addressing operation.

It is another particular feature of the invention that a memory cell to the bit level is composed of very few parts. A bit cell includes a region (node), which can be isolated, and which can hold a capacitive charge relative to ground. During a memory read phase that node controls the voltage of the read line by controlling the gate and state of condition of an MOS field effect transistor with capacitive positive feedback in the memory cell. This main storage node of a cell is not depleted of its charge, but a second MOS transistor applies operating voltage to the drain electrode of the first transistor during read phases and read-addressing of the particular cell.

The read output line was previously discharged to ground and is maintained at floating potential prior to the read phase so that it can follow instantaneously the potential impressed upon it during a read operation. A refresher amplifier senses that change (or non-change) in potential of the read output line, and in response thereto a node included in the refresher amplifier is either discharged or maintains its charge, and the resulting charge is copied into a second node in the refresher amplifier. That charge in the first node of the refresher amplifier has been established during the previous memory write cycle as a preparation step for the entire memory.

The refresher amplifier is common to all memory cells or locations holding bits in the same word position for all the various memory locations to the word level. Therefore, the individual bit cells connected to the same refresher amplifier are addressed through different addressing signals, i.e., they are never concurrently addressed.

During a read cycle, the data write line is prepared, as a node, by receiving a particular charge. During the following write-refresh cycle, the charge state of the second node of the refresher amplifier controls, in turn, discharge or non-discharge of the data write line node. Concurrently, thereto the node in the addressed memory location is coupled through write-addressing to the write line to refresh its charge state therefrom.

In order to permit operation of the memory in consonance with an overall two-phase operational requirement, the decoding process is carried out as follows. For each memory location to the word level there is, for example, established a particular decoder node. During a memory write phase all of these nodes as pertaining to the different word-address locations are being charged. A plurality of MOS transistors is coupled to a decode node. These transistors are individually controlled by digital addressing input signals and process them, for example, in a logic "OR" configuration. Each plurality of such transistors receives a different combination of addressing signals. During the next read phase signal, which is also the first phase of a memory cycle, all of these decoder nodes, except one, are discharged. That one, non-discharged node controls now the generation of a pair of sequential decoded phase and addressing signals. The first phase addressing signal of the pair concurs with the particular first phase read phase signal, but is applied to those memory locations only defining the bit cells of that particular word address location. In response to the production of such decoded phase signal, a second phase addressing signal is produced to succeed the first phase signal and to write-address the same memory locations to the bit level for write-now, or write-refresh operations.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

the FIGURE is partially a circuit diagram, partially a block diagram, or a memory constructed in accordance with the present invention.

Proceeding now to the detailed description of the drawings in the FIGURE there is illustrated a memory system which incorporates the various features of the present invention. In particular, the memory system is comprised of a plurality of individual storage cells 10 arranged in a matrix. Additional indecia denote the position of the respective cells in the matrix. Therefore, there are illustrated in particular four memory cells 10-00, 10-01,10-10, 10-11. The memory bank may include additional memory cells. The first digit in each index number denotes the address of a memory location to the word level and in decimal notation. Each word has a plurality of bits, and the second digit in each index number denotes the bit position within a word or word location. Therefore, the memory cell illustrated in greater detail and as a circuit diagram pertains to a word location having the address code (decimal) 0 and the cell holds the zero order bit of the data word stored in that location; the cell, therefore, defines bit position zero.

The bit cells of a row of the matrix pertain to the same memory location to the word level; cells in a column pertain to different word locations but define the same bit positions. Bit cells of the same row are addressed concurrently; bit cells of the same column are never concurrently read out or written into.

From a different point of view, each memory cell to the bit level can be regarded as being located at the intersection of two pairs of lines. A first pair includes generally addressing lines y and y' denoting additionally by an appropriate decimal index the word address to which they pertain. Therefore, there are illustrated in particular the two addressing lines Y0 and Y0' and a second pair Y1 and Y1'. There are, of course, as many of those pairs of addressing lines as the particular memory or section of a memory has locations to the word level.

Energization of these lines Y and Y', in a manner more fully described below, causes addressing of all bit cells of a word location, W0 in particular a line Y is enabled and energized for read-addressing and 0 line Y' is enabled and energized subsequently R0 for write-addressing.

The other pair of lines traversing a bit location, comprises a data write line W and a data read line R. In particular, the line WO is the data write line for all bit cells on bit position O in all words of the memory, and line RO is the corresponding data read line for all these bit cells of bit position zero. The drawing shows an additional pair of lines W1 and R1. There are, of course, as many pairs of these read and write lines as there are bit positions in a word.

It is an inherent characteristics of MOS type circuits when used for static storage that the content of a memory cell must be refreshed or restored as each cell works on the principle of capacitive storage in nodes within an integrated circuit ship, and inherently there is some leakage involved which must be offset by recharging the storage capacitance involved in order to maintain the logic content of such a cell.

The pair of data lines pertaining to one column of bit cells are interconnected through a double inverter 50, also called refresher amplifier. The amplifier stores the bit which has been read from one of the cells during a read phase, and applies same to the data write line during the succeeding write phase, to refresh the charge in that cell from which the bit has been read.

Data to be written into the memory cells of an addressed word location are received from external devices such as a processor or the like. There is illustrated an input register 20 having stages 20-0, 20-1, i.e., having as many stages as a word has bits within the chosen format. It is optional to consider register 20 as part of the memory, i.e., as memory input buffer, or as output buffer of the data source. The several stages of register 20 have their respective (single-ended) outputs coupled to the data write lines W0, W1, etc. It is further presumed that during refresher cycles or phases when new data are not written into memory, register 20 keeps the write lines W at floating potential whereas during writing of new data the outputs of register 20 exercise dominance over the write lines. This may be accomplished through suitable gating and other conventional techniques.

Data read from memory are set into a memory read-out register 25 having stages as 25-0, 25-1, etc. to receive data bits read from the bit cells of a read-addressed memory location. The inputs of the several stages of memory readout register 25 are coupled to the data read lines R0, R1 etc. via suitable buffers and isolation amplifiers 21-0, 21-1, respectively.

It should also be mentioned here that register 25 does not necessarily pertain to the memory system but may constitute a component of the processor to which the memory is connected. Output terminals of buffers 21-0, 21-1 are output busses of that chip while lines W0, W1 etc. are input busses thereof. Preferably, the memory cells, read and write lines, addressing lines and output buffers are on a single MOS chip, the registers 20 and 25, or one of them, may also be located on that chip.

Memory operation is under timing control of a timing circuit 26 providing the phasing signals $\phi1$ and $\phi2$. It should be mentioned that within the digital data processing system, of which the memory is a part, these timing pulses may already be in existence and already be provided; nevertheless, a source for such timing and phasing signals is an essential ingredient of this particular memory device. Moreover, it is a particular feature that there are only two phasing signals $\phi1$ and $\phi2$ required in this circuit.

These phasing signals $\phi1$, $\phi2$ are pulses of short duration and can be described as two separate pulse trains wherein the pulses are interspaced. The pulses in each train may have repetition rates in the megacycle range. The leading edge of a pulse of one train is slightly delayed to the trailing edge of the preceding pulse of the other train. All operations in the memory circuit are time-phased and controlled through these pulses whereby in particular power is also derived directly from and through these pulses for most of the circuit elements within a MOS chip. A pair of sequential signals $\phi1$ and $\phi2$ establishes a memory cycle, $\phi1$ controls the read phase, $\phi2$ the write phase.

The phase signals $\phi1$ may serve as clock signals (or a clock signal can be derived from $\phi1$) to clock data read from memory into read buffer 25. Analogously, the same clock can be used to clock external data into write buffer 20 to be available during the next write phase.

The memory system further includes an address register 22 which for reasons of simplification is shown to contain three stages A, B and C, assuming that there are eight different word locations. Of course, the addressing continuum can be smaller or considerably larger, the chosen number is exemplificatory only.

The address register 22 receives, for example, addressing signals, from the external processor (not shown) via an input gating circuit 23. Addressing signals passed by gates 23 to register 22 define the individual address of a memory location to the word level, and the content of address register 22 controls the memory accessing operation. All operations in the memory circuit are designed so that register 22 can be reloaded, i.e., the address number held therein can be changed during a read cycle of a memory cycle. As will be developed in detail shortly, the phase signal $\phi1$ defines and establishes the read cycle in the system and can thus be used as gating signal for gates 23.

As was mentioned above, the storage cells of an MOS type memory do not hold their content (charge of a node) indefinitely long. The charge must be refreshed periodically. It is, therefore, necessary that at times the memory as a whole runs through a refreshing cycle. During such refreshing cycle, of course, access of the memory to the external processor must be temporarily suspended or at least somewhat delayed. During refreshing operation the memory may operate as non-random or quasi-random access memory, as will be explained shortly.

During refreshing, register 22 is in essence operated as a counter for addressing in sequence all of the locations of the memory to the word level. An external timing control 27 provides control pulses at a rate as needed or as deemed advisable for the cyclically repeated refreshing operation, which rate is, for example, in the kilocycle range. The pulses from source 27 set a flip-flop 28 which, when set, inhibits gate 23 so that the register 22 cannot accept addressing signals from the external source.

Flip-flop 28 when in the set state enables a logic network 29 which is an interconnect network for register 22 causing (1) register 22 to assume a particular count state such as decimal zero and (2) to operate as a counter, particularly for counting pulses $\phi 2$. The operation may be self-controlling in that after the counter has run through a complete counting cycle counter-register 22 recycles through the count state zero. A count-state-zero detector 24 responds, resets flip-flop 28 and normal memory operation can be resumed. Register 22 can again accept addressing signals at memory cycle rate, i.e., at the repetition rate of the pulses $\phi 2$ which, as stated, is in the megacycle range.

As was briefly alluded to above, during a refresher cycle the memory can operate as non-random access memory in that a memory location address supplied to gates 23 is maintained thereat until the counter register 22 reaches that number. Concidence between the address supplied and the state of counter 22 can be monitored externally and used to output the content of read buffer 25. In case of writing, the coincidence condition controls suppression of the content of the readout location in the refresher amplifiers 50 and a new content is passed to write lines W in lieu of refreshing. If counter 22 has already passed that number when provided as address by the external processors, memory access must be deferred until completion of refreshing.

The refresher cycle, of course, lasts for a period equal to the duration of a memory cycle times the number of memory locations to the word level or rows of bit cells to be refreshed. In a large memory different portions or sections may be refreshed at different times thus reducing the probability of conflict between refreshing and external demand for access.

The address register with input control as described is not necessarily on the memory chip. However, the decoder network 30 to be described next is preferably on the same chip as the associated memory locations, whereby the register output lines from stages A, B and C provide the connections to the memory chip.

The content of register 22 defines at any instant digital representation of memory addresses and must be decoded, there are provided decoder networks accordingly. In particular, decoder 30-0 responds to signals A, B and C in logic NOR-function (or OR-function with inverted output) thereby defining memory location to the word level 0 having decimal address. Therefore, if, for example, the signals A, B and C each are false in register 22 (in representation of a decimal-zero-address), addressing lines Y0 and Y0′ are to be enabled for addressing the memory bit locations or cells on this pair of addressing lines. Each decoder 30 is operated for response by the timing signal $\phi 1$.

A decoder and the corresponding pair of addressing lines Y, Y′ are interconnected by operation of a clock gating network 40 processing the decoder outputs as they are provided at a phase $\phi 1$ so that concurrently one of the lines Y0 or Y1 etc. is enabled while the other ones are disabled. Furthermore, the respective other line of the particular pair (Y′0, Y′1 etc.) is enabled at the respective next timing signal $\phi 2$.

Generally, during phase time $\phi 1$, a particular read addressing line Y is gated open and all memory bit locations on that addressing line are read. For example, if decoder 30-0 has responded line Y0 is enabled, and all cells connected to that line apply their respective contents to data read lines $R_0$, $R_1$ etc. to be set into data read buffer register 25. During the succeeding phase time $\phi 2$ there is a writing operation. During this operation the corresponding write addressing line, for example, Y′0 is enabled and causes the digital content of write lines $W_0$, $W_1$, etc. to be set into the respective memory cells.

Read and write operations will occur both during the so-called refreshing operation whereby the digital content read from a read-addressed cell on a read line is set into the refresher amplifier on that line, and the same bit is cycled back to the data write line, and from there it is passed back during write phase $\phi 2$ into the same cell from which it has been read, and which is now write-addressed.

In case communication with memory is requested from an external device, there is always a read cycle; though optional it is convenient to provide always a refresher operation following each read phase analogous to the restore operation of a regular memory refreshing cycle without external communication and thus being analogous to the restore operation in a core memory with destructive readout.

External writing will depend on the fact of whether or not a new content is held in write buffer register 20 concurrently with addressing. If there is such a new data word it will be written into the addressed memory location. Independently therefrom, read buffer register 25 may also receive the data read from the same location during the preceding read phase and it is up to the external processor to disregard the content of read buffer register 25 or to accept it.

After having described the overall memory system organization we proceed now to the description of several of the individual components involved.

Each memory cell is comprised of three MOS insulated gate, field effect transistors 11, 12 and 13. The transistors are provided as P-channel type transistors operated in the enhancement mode. This is to be understood by way of example only, and other types of field effect transistors can be used. Transistor 11 has its gate electrode connected to the addressing line for reading such as line Y0. The drain electrode of transistor 11 connects to data write line W0. The source electrode of transistor 11 connects to the drain electrode of transistor 12. The junction establishes a node N2 which, however, is not used for storage of any charge, but for isolating the drain electrode of transistor 12 from the system. The source electrode of transistor 12 is connected to a data read line such as R0.

Source and gate electrodes of transistor 12 are interconnected by a capacitor 14 providing positive feedback. The capacitor 14 may be constructed on the integrated circuit chip as an extension of the particular semiconductor region establishing the drain electrode and by the metal plate establishing the gate electrode thereabove, separated by the silicon dioxide layer outside of the channel region.

The gate electrode of transistor 12, the capacitor 14 and the source electrode of transistor 13 are connected to establish in effect the principal storage node N1 for this particular memory cell.

The charge or node N1 may be zero or negative corresponding to a particular operating voltage relative to ground, i.e., relative to a reference potential as applied, for example, to the substrate of the chip.

The charge held in the region of the chip as adjoined by these three electrodes determines the logical content of the cell, as far as bit value and storage thereof is concerned. The association is arbitrary in principle, but it is convenient to stipulate that a negative charge in node N1 represents a bit value "one," absence of a charge relative to ground represents a bit value "zero."

The drain electrode of transistor 13 is connected to the data write line such as W0, while the gate electrode of transistor 13 connects to the other addressing line on which the cell is located and in this particular illustration is the write addressing line Y′0.

Memory read and write operations cannot be described fully without first mentioning that the data read line $R_0$ is also in fact a capacitive node on the MOS chip. Line R0 is connected to the drain electrode of a transistor 16-0 having grounded source electrode and having its gate connected to receive write phase signal $\phi 2$. Therefore, the data read line $R_0$ is discharged or neutralized by and during each write phase signal $\phi 2$. The other data read lines of the memory and pertaining to other bit positions are analogously connected to ground during each phase signal $\phi 2$. Thus, the data read lines have in fact floating potential prior to and at the beginning of each read phase signal thereafter. Grounding of the read lines during a write phase is a preparatory step for the read phase of the next memory cycle.

The data write lines $R_0$ (and the other write lines of the system) are connected to receive negative charge potential as a node during each read phase signal $\phi 1$. The circuit is designed so that this negative charge on line $R_0$ during read phase $\phi 1$ is used during reading but is also a preparatory step for the write phase thereafter. Accordingly, there is a transistor 15-0 connected with its source electrode to write line $W_0$, and having common gate-drain connection for bias by phase signal $\phi 1$.

The read operation of a particular cell, for example cell 10-00, proceeds as follows: as was repeatedly mentioned above and as will be verified below signal $\phi 1$ denotes the read cycle. Therefore, negative voltage is applied during $\phi 1$ by operation of transistor 15-0 applying negative voltage to line W0. Write line W0 serves actually as a pulsed power bus during reading. Line Y0 goes negative also for read-addressing cell 10-00, and transistor 11 is rendered conductive and applies negative operating voltage or bias to the node N2. Thus, operating voltage is now applied to the drain electrode of transistor 12. If the charge of node N1 is approximately at ground level, assumed to represent a bit value "zero," transistor 12 remains in its off-state so that "0" or ground is applied to data read line R0. Read line R0 has been discharged previously via transistor 16-0, and thus maintains ground potential.

The read register 25, i.e., the individual stages thereof, are clock-operated by signal $\phi 1$, or by a clock derived from $\phi 1$, to serve, for example, as a trailing clock trigger, so that with the falling edge of $\phi 1$ or thereabouts a "0" is set into stage 21-0. In case the system operates for memory refreshing in lieu of or concurrently with the readout process, depending upon the system design, a logical "0" is applied to the input of the refresher amplifier 50 during $\phi 1$.

Assuming a negative charge is held in memory cell storage node N1, corresponding to a bit value "one;" as phase signal $\phi 1$ is applied and read addressing line Y0 goes negative to render transistor 11 conductive, transistor 12 is likewise rendered conductive by the negative gate voltage. Accordingly, a negative voltage is applied now to data read line R0. That negative voltage is actually the negative $\phi 1$ signal level applied by transistor 15-0 to the write line W0, from there through conductive transistors 11 and 12.

Operation of transistor 12 requires detailed consideration in this case. As the drain electrode of transistor 12 is pulled negative, the negative gate voltage of transistor 12 renders the transistor conductive and its source electrode potential at line R0 begins to drop. The capacitor 14 feeds that negative drop back to the node N1 and to the gate of transistor 12 to become more negative, thus providing positive feedback. As a consequence, any losses due to a previous leakage from node N1, are immediately compensated, the power applied to line R0 being in effect provided by signal $\phi 1$.

The potential of line R0, therefore, drops negatively at a steep rate and practically without delay following the leading edge of $\phi 1$ as concurring with the read addressing signal in line Y0. It is important that normally and particularly immediately prior to a timing pulse $\phi 2$ line R0 is at a floating potential with no charge relative to ground. Therefore, its potential will follow instantaneously the negative swing produced by the aforedescribed operation. This, in effect, amounts to a very fast readout, a very fast presentation of the particular bit value, particularly for bit value 1, to be set, for example, into stage 25-0 of read buffer 25. This fast presentation of bit values, of course, is of particular advantage for the refreshing operation causing the negative signal as read from a cell is to be set quickly into the read-restore amplifier 50 as will be described below.

Memory recording or writing, either because of a memory write demand made by the external device or as the consequence of a refreshing cycle, occurs in the succeeding phase $\phi 2$. After signal $\phi 1$ has decayed the read lines R retain their respective potential and the following phase signal $\phi 2$ of the succeeding write phase renders transistor 16-0 and others conductive to discharge the read lines, including line R0 to ground.

During recording, of course, $\phi 1$ is false which means that transistor 15-0 and others controlling the write lines during reading is not conductive. This, in turn, means that the potential of line W0 and others is under control, either of the output of refresh-recycle amplifier 50, or, if a new content is to be stored in the memory cell, potential of line W0 is dominated by the output of write buffer stage 20-0, while recycling operation of amplifier 50 is suppressed. In any event, it is presumed that during a phase time $\phi 2$ line W0 obtains a potential indicative of a bit value to be stored into a write-addressed cell.

Of course, transistor 11 remains non-conductive during writing as the read addressing line Y0 is false, at ground level, during write phases $\phi 2$. However, write addressing line Y'0 receives a negative voltage because the control circuit 40 provides negative voltage to line Y'0 during $\phi 2$ if it provided negative voltage to line Y0 during the preceding $\phi 1$ as a result of decoding memory address (decimal) 0. Thus, the gate electrode of transistor 13 goes negative and transistor 13, therefore, operatively connects node N1 to line W0. Node N1 is, therefore, charged negatively if line W0 is negative in representation of a "one;" node N1 remains uncharged or discharges to ground potential, when line W0 is at ground.

Node N1 is isolated from the read circuit and is, therefore, not affected by the concurrent application of ground to the read line R0 through transistor 16-0 during write phase $\phi 2$. Transistor 12 remains nonconductive during the write phase because transistor 11 is off. The capacitor 14 isolates, of course, the line R0 from the node N1 and in addition serves as a capacitive storage extension of the inherent capacitance between the gate electrode and principle electrodes of the transistors which is used as storage facility in this particular circuit. Analogous operations, of course, proceed in the other cells of the addressed word location, i.e., the cells 10-01, etc., as disposed along the lines Y0 and Y0' and as connected thereto.

Proceeding now to the detailed description of double inverter 50 operating as refresher amplifier for all memory cells on a column, the amplifier includes five MOS transistors, 51 through 55. The input terminal for the doubly inverting amplifier is established by the gate of transistor 51. That gate is connected to the read line such as R0. The source electrode of transistor 51 is grounded while the drain electrode thereof is connected to a node N5. Node N5 is established further as the junction of the source electrode of transistor 53 and of the source electrode of a transistor 52 having common drain and gate connection for receiving $\phi 2$. Thus, during a write cycle, when the read line R0 is grounded through transistor 16-0, node N5 receives a negative charge through transistor 52.

The output stage of doubly inverting amplifier 50 includes the transistor 55 for controlling in particular the potential of the write line W0 during write refresh operations. The gate of 55 receives a signal $\phi^*2$, and the source electrode thereof is connected to the drain electrode of transistor 54 having ground source electrode and a gate connected to a node N6, to which the drain electrode of transistor 53 is connected. Transistor 53 interconnects the two nodes N5 and N6 and has its gate controlled by phase signal $\phi 1$, i.e., the content held in node N5 is transferred to N6 during read phase $\phi 1$; that transfer being accelerated by operation of a feedback capacitor 56 interconnecting gate and source electrodes of transistor 53.

Signal $\phi^*2$ differs from the regular write phase signal $\phi 2$ in that $\phi^*2$ is not true during $\phi 2$ when there is an external write demand. This distinction becomes operative for suppressing the bit which has been read and which is to be substituted by a new one. Thus, the dependency of signal $\phi^*2$ upon write demand controls distinction of write from write refresh operation.

It should be interjected here, that write and write refresh operations can be distinguished in another way. For example, circuitry can be provided to couple the nodes N6 to the respective write buffer outputs. If there is no write demand, the charge state of node N6 is determined by the contend of the bit cell which has been read. If there is a write demand, the charge state of node N6 is controlled from the respective buffer stage during phase $\phi 2$ (discharging the node or charging it independently from the charge state established during preceding phase $\phi 1$). Thus, in this case, external write simply overrides the write refresh operation. Transistor 55 is also rendered conductive during $\phi 2$, but now for all write operations, while the write lines are not directly connected to the write buffer as illustrated.

The refresher amplifier as illustrated operates as follows: During the write cycle $\phi 2$ preceding a particular read cycle, node N5 is charged while any residual charge on line $R_0$ is discharged through transistor 16-0. This is a preparatory step for the next read cycle operation as it affects the amplifier 50. Subsequently to that write cycle, a particular memory cell on the lines W0, R0 is read-addressed and controls the potential of line R0 as aforedescribed. Line $R_0$ holds no charge relative to ground and is in effect floating, until the leading edge of read phase signal $\phi 1$ arrives.

As the phase signal $\phi 1$ begins to swing negative a negative charge content of node N2 in the read-addressed memory cell causes the potential of line $R_0$ to begin to drop away from ground immediately, there are no charges in line $R_0$ relative to ground which have to flow off. As the potential of $R_0$ drops through the threshold response level of transistor 51, that transistor opens and node N5 discharges to ground. Concurrently, the signal $\phi 1$ operates in the transfer circuit as between nodes N5 and N6 as follows:

The negative signal swing at the electrode of capacitor 56 connected to the $\phi 1$ terminal tends to cause the voltage at node N5 to drop further, thus increasing the speed of discharge of node N5 to ground. Moreover, as node N5 approaches ground, node N6 discharges likewise through transistor 53 to ground any residual charge it may have.

It follows from the foregoing that a negative going readout signal in read bus R0 causes nodes N5 and N6 to discharge, and to remain discharged after decay of $\phi 1$. In other words, a bit of value "1" read from a cell is inverted and stored as a "-zero" in node N6. In the following, it will be described how that "zero" in node N6 is again inverted during the following write phase to refresh the "one" held in the memory cell from which it was copied previously.

It will be recalled that during the read cycle ($\phi 1$) write line W0 is charged by operation of transistor 15-0. However, concurrently a data bit may have been set into write buffer stage 20-0 and the output of that stage now dominates line W0.

If, during the succeeding write cycle or phase ($\phi 2$), the potential of lien W is still dominated by the content of write buffer stage 20-0, signal $\phi^*_2$ is not produced, so that node N6 does not control line W0. Without external writing $\phi^*_2$ turns true (negative) and a refresh operation takes place.

Transistor 55 is opened by $\phi^*2$, but if the node N6 has been discharged previously, transistor 54 remains non-conductive so that a negative charge in line W0 is maintained and a negative signal (bit value "1") is thus applied from line W0 to node N1 through gated-open transistor 13, so that the charge of node N1 is refreshed.

Turning back to the read phase and assuming that during read phase $\phi 1$ the output stage (12) of the memory cell that has been read out has a discharged storage node N1, then read line $R_0$ will remain at ground potential, and transistor 51 will remain nonconductive. Accordingly, node N5 is not discharged and remains negative. Instead, there is a charge transfer to node N6. Capacitor 56 still provides positive feedback, because node N5 is isolated and receives merely the capacitively coupled negative signal voltage $\phi 1$ as applied to the gate. The resulting voltage drop of node N5 relative to ground opens transistor 53 to charge node N6 sufficient to render transistor 54 conductive during the succeeding write refresh phase. Transistor 54 is gated open by a "one" in node N6, and as transistor 55 is opened by phase signal $\phi^*2$ line $W_0$ is discharged to ground via transistors 55 and 54. The particularly write-addressed cell node N1 is now effectively connected to ground through transistors 13, 55 and 54. Thus, a bit of value "0" is stored as a "one" in node N6 during the read phase and is inverted again to be set as a "zero" into the same cell during write refresh for discharging any stray charge as it may have accumulated in node N1 thereof.

After having described the operation of a bit cell and of the memory refresh operation, it shall be described that, within the system of memory read and memory write, the decoding and accessing is part of the timing cycle required for proper memory read and/or write. Proceeding, therefore, first to the description of the decoder, 30-0, it was assumed that the word location (decimal) 0 is addressed when all stages of register 22 are in the (binary) 0 or reset state. The gating circuit included in each of the decoders 30 can be regarded as a logic NOR circuit as to its input signals proper. As to the addressing code symbols themselves, the decoder realizes the AND function.

Each of the decoders has three inputs receiving signals A or $\overline{A}$, B or $\overline{B}$, C or $\overline{C}$, respectively, and established by the gate electrodes of three field effect transistors 31, 32 and 33. The particular assembly of transistors, respectively, receives signals A, B and C. The transistors have grounded source electrodes and interconnected drain electrodes establishing within the system the common junction 34. The circuit 31, 32, 33 and 34 thus realizes in effect the function $\overline{A}\cdot\overline{B}\cdot\overline{C} = \overline{A+B+C}$. There is a parallel operating set of decoding transistors, **31*a*, 32*a*, 33*a* connected to receive the same addressing signals and interconnected to form a common drain electrode junction 34*a***.

It is thus apparent that junctions 34 and 34a will always be grounded unless $\overline{A} = \overline{B} = \overline{C} = 1$. In all other cases junctions 34 and **34*a* will be grounded through one or more conductive transistors 31, 32, 33 and 31*a*, 32*a*, 33*a*. A decoder control and timing transistor 35 has its gate electrode connected to receive signal $\phi 1$ and connects junction 34** to a node N3 through its drain-to-source channel. There is a node analogous to N3 for each memory address and in each associated decoder.

All of the nodes N3 have been charged through respective transistors 41 during the preceding write phase $\phi 2$. It will be recalled that each memory cycle comprises a write phase $\phi 1$ and a read phase $\phi 2$ involving the same address. During each write phase $\phi 2$, all these nodes N3 are charged in preparation for the decoding carried out during the next read phase $\phi 1$ and pertaining to the next memory cycle.

It follows from the foregoing that read-addressing of a particular memory location is derived from the charge state of the respective node N3 during read phase times $\phi 1$. Write-addressing cannot be derived directly from the particular charge state of the nodes N3 during write phase time $\phi 2$ as all these nodes are charged by $\phi 2$. Instead, write addressing of the cells of a memory location is made contingent upon previous read addressing of the same cells.

A node N3 is effectively connected to ground during phase $\phi 1$ when the respectively associated transistor 34 is conductive unless the address held in register 22 has an addressing code causing none of the transistors 31, 32, 33 to become conductive. In other words, all nodes N3 are connected to the associated junction 34 in the respective decoder, and all but one junction 34 are grounded to discharge the respective nodes N3 during phase time $\phi 1$. The decoding process, therefore, involves discharge of all nodes N3 but one at the beginning of phase $\phi 1$, so that during the phase $\phi 1$ one node N3 is negatively charged, the others are at ground potential.

It may be assumed that the particular node N3, illustrated in the detailed circuit, retains its charge and, therefore, was addressed. Now, operation of the timing and internal phase decoding circuit 40 illustrated has to be considered. From a certain point of view transistor 41 and even transistor 35 can be regarded as being a part of that circuit. A transistor 42 has its drain electrode connected to receive also the read phase signal $\phi 1$ and its gate is connected to node N3. A feedback capacitor 43 connects the source electrode of transistor 42 to the gate thereof.

The source electrode of transistor 42 connects to read addressing line Y0 controlling the potential thereof during each read phase $\phi 1$. Additionally, junction 34a connects to line Y0. Junction 34a is grounded parallel to junction 34 when the particular decoder has not responded. This way any residual charge remaining on line Y0 and across capacitor 43 due to previous addressing is discharged. In case none of the transistors 31a, 32a and 33a is rendered conductive, the potential of line Y0 is controlled through transistor 42.

As stated above, node N3 is charged negatively during $\phi 2$ and fails to discharge during $\phi 1$ if the particular decoder has responded to address code (decimal) zero to access the memory location presently considered as being the addressed one. Therefore, as soon as $\phi 1$ goes negative, transistor 42 is rendered conductive. As soon as the voltage of the source electroce of transistor 42 begins to drop, capacitor 43 provides feedback and node N3 goes more negative, thereby overcoming the threshold drop across the MOS transistor, and the full nevative voltage of signal $\phi 1$ is applied to the source electrode of transistor 42, i.e., negative voltage appears in read addressing bus Y0.

This negative addressing voltage in line Y0 is applied to all of the transistors 11 in the several memory cells along line Y0. One can see that a line Y, such as Y0, is enabled and becomes negative only (1) during a read phase $\phi 1$ and (2) when the particular memory location is being addressed. In essence then, the negative signal fed into a line Y, such as Y0, can also be designated a read phase decoder output.

Depending upon the number of memory cells (bits per word) connected to an addressing line, the switching operation involves a comparatively heavy load for transistor 42. The positive feedback provided by capacitor 43 is an essential part of the operation in order to raise overall speed and particularly in order to obtain a steep rise of the read addressing signal in line Y0. As a consequence of the positive feedback, the full negative signal level of $\phi 1$ is obtained on line Y0 overcoming the threshold drop in transistor 42.

It will be recalled that depending upon the speed of the signal in read addressing line Y0 the several data read lines as connected to addressed cells holding a "one," are to swing negatively away from ground potential to cause discharge of the node N6 in the respective refresher amplifier. This latter operation is in essence the last one of a sequence of phase $\phi 1$ operation which begins with transistor 42 becoming conductive; that operation must thus be rather fast.

Concurrently to read-addressing proper, the read phase signal $\phi 1$ renders a transistor 44 conductive. All transistors within the various circuits 40 and corresponding to the particular transistors 44 illustrated receive the negative voltage $\phi 1$ at their respective gate. The transistor 44 has its drain electrode connected to line Y0. Thus, only that one of the plurality of transistors 44 connected to an enabled read addressing line Y, will conduct to cause its source electrode to become negative.

The source electrode of transistor 44 is connected to the gate electrode of another transistor 45 and establishes therewith another node, N4. This state of conduction of transistor 45 now depends on the voltage level of line Y0. One can, therefore, say that the logic content of node N3 controls read addressing line Y0 at phase time $\phi 1$ and it controls also establishing of a charge in node N4. Accordingly, the logic content of node N3 is copied into node N4 at read phase time $\phi 1$. Storage of that logical content in node N4 does not mean any weakening or even depletion of the charge in node N3, as the latter merely controls copying of a logical content to N4 but there is no charge transfer. Accordingly, the operation of potential and voltage control of line Y0 for purposes of read addressing the cells on that line is not impeded.

A node N4 when receiving such a negative charge, retains that charge until the time of the write phase $\phi 2$ as succeeding a read phase $\phi 1$. The system has, of course, a plurality of these nodes N4, as many as there are addressable memory locations to the word level. Only one thereof receives a negative charge, the others remain discharged. This is the instrumentality by operation of which write-addressing is made contingent upon previous read-addressing of a particular memory location, as all nodes N3 are recharged by negative voltage during and by signal $\phi 2$.

The transistor 45 has its drain electrode connected to receive the phase signal $\phi 2$, and its source electrode is connected to and leads into the write addressing bus Y' and particularly in the full illustrated example it leads to line Y'0. It was already mentioned above that the gate electrode of transistor 45 is controlled by node N4. The feedback operation is repeated for this particular circuit. There is, therefore, a capacitor 46 connecting the source electrode of transistor 45 to the gate electrode thereof.

Accordingly, as soon as signal $\phi 2$ is applied to the drain electrode of transistor 45, the transistor is rendered conductive, by operation of a negative charge in node N4 as connected to the gate. The positive feedback through capacitor 46 causes the gate electrode of transistor 45 to go more negatively, and as a consequence, the threshhold voltage in transistor 45 is overcome, and the full negative signal voltage of $\phi 2$ is applied to write addressing line Y'0. The write addressing signal in line Y'0 can thus also be termed a write phase decoder output as it is the logic combination of addressing a particular memory location at phase time $\phi 2$.

During the steady state of the signal $\phi 1$ at negative level, the charge across capacitor 46 equalizes. Write-addressing of all the cells is controlled as has been already outlined above; the transistor 13 in all write-addressed cells are rendered conductive, and the respective nodes N1 are controlled in dependence upon the voltage of the write lines W.

During write phase $\phi 2$ the transistors 42 of all the circuits 40 are non-conductive so that there is complete isolation between nodes N3 and N4, and the concurrent restoration of a negative charge in all nodes N3 has no bearing at all on the concurrent control of all write busses as that control is made exclusively dependent upon the respective charge state of nodes N4. As write phase signal $\phi 2$ decays the drain electrode of transistor 45 returns to ground; the source and gate electrodes (node N4) follow at the next signal $\phi 1$.

With regard to the non-addressed memory word locations the respective nodes N3 are discharged during $\phi 1$. The impedances must be chosen, that these nodes discharge more rapidly than the respective transistors 42 can turn on, so that the read addressing busses of the non-addressed memory locations remain at ground potential, or are discharged through the respectively grounded junction 34a if still charged from prior addressing. Furthermore, nodes N4 are not charged when the respective line Y0 remained at ground potential during read addressing.

The memory as is described operates as follows:

A memory cycle is composed of a read phase $\phi 1$ and of a write or write refresh phase $\phi 2$. During such memory cycle the same memory location is addressed. However, it is an essential feature of the system that during the respective preceding write or write refresh cycle $\phi 2$ the circuit as a whole is also address-independently prepared for the next memory cycle. Therefore, description of a memory cycle must be preceded by a description of these preparatory operations during the respective preceding write or write refresh cycle $\phi 2$. These steps include, charging the nodes N3 of all address-gating circuits, discharging all data read lines R, and charging the nodes N5 of all refresher amplifiers 50.

The memory cycle begins with the read phase but reading proper is initiated by address decoding and accessing.

Signal $\phi 1$ gates externally provided addressing signals into the address register 22 or increments the address counter 22 depending upon the type of operation desired. Regular random access to a particular memory location or access pursuant to a refreshing operation are controlled in the same manner; the addressing operation proper is independent from the purpose of accessing.

The respective address decoder 30 causes, by operation of its response, the respectively associated node N3 not to be discharged, all other nodes N3 are discharged. Non-discharge of a node N3 operates as addressing proper as the respective transistor 42 connected thereto is rendered conductive, causing the potential of the connected read addressing line Y to drop to addressing potential.

The memory cells on that line Y cause the charge content of the respective nodes N1 to control the voltage of the read lines R connected thereto. The charge contents of the nodes N1 as representing bit values may also control the input of read register of a buffer 25. In addition, the resulting voltages in lines R control the charge states in nodes N5 in the respective refresher amplifiers and as respectively transferred to nodes N6 therein. The operation amounts to a logical inversion of the read out bits.

The read cycle phase operates also as preparatory control for the write cycle in the same memory location. For this, all write lines W are charged through the respective transistors 15. Also, the node N4, associated with the addressed word location, is charged to render write-addressing contingent upon the preceding read addressing.

During the succeeding write cycle $\phi 2$ the write addressing bus Y′ as associated with the previously activated read addressing bus Y is enabled by coupling the respective node N4 to that bus Y′. As a consequence, the contents of the nodes N6 in the refresher amplifiers 50 control discharge or no-discharge of the write lines W, and this in turn controls the charge state of the nodes N1 in the same but now write-addressed locations. The concurrently occurring preparatory measures for the next memory cycle have already been explained.

The invention is not limited to the embodiments described above but all changes and modifications thereof not constituting departures from the spirit and scope of the invention are intended to be included.

We claim:

1. In an integrated circuit memory operating in response to first and second alternating phase signals and in further response to digital addressing signals, comprising:

decoder means connected to receive the first and second phase signals and to receive the addressing signals and providing a pair of sequential addressing outputs respectively during a first, and a succeeding second phase signal for each digital signal received during a first phase signal;

a plurality of data-read-lines, one per bit position within a chosen multi bit word format, there being as many data lines as a word has bit positions;

a plurality of memory cells to the bit level and organized to the word level, each memory location to the word level having as many cells as the plurality of word has bits, the cells of the plurality pertaining to the same memory location to the word level connected to receive a pair of said outputs as provided in response to a digital signal representing the address of the word, each memory cell having a storage node;

first means included in each memory cell to control voltage in the respective data read line in response to a first phase addressing output of the pair as provided by the decoder means, when received by the cell, and in dependence upon the charge level in the storage node of the respective cell;

a plurality of second means respectively connected to the data read lines of the plurality and each including a node the voltage thereof controlled by the respective date read line during a first phase signal independently from addressing signals, each of the second means provided for refresh-recycling data of all memory cells connected to the respective data read line, one at a time, as addressed by a first phase addressing output;

a plurality of data-write-lines, one per bit position;

third means included in each memory cell to connect operatively the storage node thereof to the respective data write line of the plurality in response to a second phase addressing output of the pair as provided in the decoder means; and fourth means included in each of the plurality of second means and connected to be responsive to the undecoded second phase signals to couple the respective node of the second means to the respective data write line in response thereto.

2. In an integrated circuit as in claim 1, there being means connecting the data read lines of the plurality to a source of reference potential during each second phase signal, the data read line having essentially floating potential immediately prior to a second phase signal by operation of which a node of a cell of the plurality controls the voltage of the respective data read line.

3. In an integrated circuit as in claim 1, the second means of the plurality including means defining a second node capable of holding a charge, a first transistor connected to control discharge of the second node in response to the potential of the respective data read line; a second transistor operating in response to first phase signals to couple the second node to the first node; and a third transistor connected for charging the second node during and in response to each second phase signals.

4. In an integrated circuit as in claim 1 and including means for charging each of the data write lines of the plurality, effective as a node, for receiving a charge in response to each undecoded first phase signal, the respectively associated fourth means operating to discharge or to maintain the charge of the latter node in response to the charge content of the node included in the second means.

5. In an integrated circuit memory as in claim 1, the decoder means including, for each address as identified by differing addressing signals, a plurality of transistors having gate electrodes connected to receive the digital signals, further having interconnected first main electrodes, and having second main electrodes connected to a source of reference potential; means for each address establishing a node, and connected for being charged in response to a second phase signal and discharged in response to a first phase signal and through any of the transistors of the plurality when conductive; and circuit means connected for deriving the pair of gating signals from the charge state of that node.

6. In an integrated circuit memory as in claim 1, the decoder means including, for each address, means for providing a particular logic signal in response to a particular digital addressing signal; first transistor means and a second transistor, the first transistor means having electrode defining means connected between the gate of the second transistor and the means for providing the particular logic signal, the second transistor having a capacitor connected between its source electrodes and its gate, the first phase signal being applied to the first transistor means, the second phase signal being applied to the drain electrode of the second transistor, the first one of the gating outputs being derived from the source electrode of the first transistor, the memory cells pertaining to the same address connected to receive the one gating output for read addressing.

7. In an integrated circuit memory as in claim 6, the first transistor means including a third transistor and a fourth transistor, the third transistor having its main electrodes connected between the gate of the second transistor and a source for a logic signal, the fourth transistor also connected to the gate of the second transistor to provide a charge thereto in response to each second phase signal.

8. In an integrated circuit memory as in claim 6, including a third and a fourth transistor, the gate of the third transistor and one main electrode of the fourth transistor connected to respectively receive the first and second phase signals, one main electrode of the third transistor connected to receive the one gating output and having its other main electrode connected to the gate of the fourth transistor, a feedback capacitor connected between the gate and the source electrode of the fourth transistor, the second one of the pair of gating outputs being derived from the source electrode of the fourth transistor.

9. In an integrated circuit memory as in claim 1, the first means in each memory cell being a first field effect transistor, the third means being a second field effect transistor, the second transistor connecting directly the respective data write line to the node, the first transistor having its gate connected to directly the node and its source electrode connected directly to the data read line, the drain electrode of the first transistor connected to receive operating potential during each decoded first phase signal, the gate of the second transistor connected to receive each decoded second phase signal, and a capacitor connected between the data read line and the node.

10. In an integrated circuit memory as in claim 9, a plurality of third field effect transistors connected to discharge the data read lines of the plurality and to provide thereto reference potential during and in response to each second phase signal, the respective second transistors charging the data lines when rendered conductive during first phase signals in dependence upon the charge state of the node in the respective cell;

a plurality of fourth field effect transistors connected to charge the data write lines of the plurality during and in response to each first phase signal;

the second means respectively connected to control discharge of the data write lines in response to the charge state of the respective node in the second means as was established during a first phase and in response to and during the succeeding second phase signal, the second means further connected to control the charge state of the node in the second means in response to a voltage drop from reference potential of the respective data read line during a first phase signal.

11. In an integrated circuit memory as in claim 1, the first means in each memory cell including a field effect transistor having its gate connected to the node in the cell, its drain electrode connected to receive operating voltage when the cell is accessed during a first phase, the source electrode of the first transistor connected to the data read line; a plurality of field effective transistors, not pertaining to any cell, respectively connected to the data read lines of the plurality, to discharge the data read lines to reference potential in response to each second phase signal and maintaining the data read lines at floating potential in between; a plurality of field effective transistors, one in each of the seconds means, respectively having its gate connected to the respective data read line and connected with drain and source electrodes between the node of the second means and a source of reference potential to discharge the node when the voltage of the data read line falls from the reference potential level by operation of said transistor in the cell, there being means to charge the node of the second means in response to each second phase signal.

12. In a memory as in claim 11, each cell including a second field effect transistor connected directly with its drain and source electrodes respectively between the respective data write line and the node in the cell, the source electrode of the second transistor and the gate electrode of the transistor of the first means establishing the node of the cell, the gate electrode of the second transistor connected to receive the second phase addressing output of the decoder outputs.

13. In a memory as in claim 12 and including means for charging each of the data write lines of the plurality, effective as a node, for receiving a charge in response to each undecoded first phase signal, the respectively associated fourth means operating to discharge or to maintain charge of the latter node in response to the charge content of the node included in the second means.

14. In an integrated memory having addressable storage locations to the bit level, further having data bit read lines, an addressed bit location provided to set a bit into one of the data bit write lines, an addressed bit location provided to receive and store a bit set into one of the data bit write lines, a bit location being connected to a data bit read line and to a data bit write line, the combination for a bit location comprising:

a first and a second field effect transistor connected in series to each other, the second transistor connected with one of its main electrodes to the data bit read line;

a third field effect transistor connected with its main electrodes between the write line and the gate electrode of the second transistor, the latter connection establishing a capacitive storage node;

a read-addressing line connected to the gate of the first transistor to render the first transistor conductive when receiving a read-addressing signal;

a write-addressing line connected to the gate electrode of the third transistor to render the transistor conductive when receiving a write-addressing signal; and circuit means connected to the first transistor for rendering the first transistor conductive upon a particular signal in the write-addressing line, to establish signal level at the interconnection of the first and second transistor permitting the second transistor to become conductive, depending upon the charge state of said node. the other main electrode being connected to the second transistor and the gate connected to the read-addressing line.

16. In a memory as in claim 14, there being a fourth transistor connected to the read line to discharge the read line prior to each read addressing of the cell relative to a reference potential.

17. In a memory as in claim 16, there being a fifth and a sixth field effect transistor respectively having connected source-to-drain electrodes to establish a node external to the cell. The source electrode of the sixth transistor connected to the source of reference potential, the gate of the sixth transistor connected to the read line to be rendered conductive when the voltage of the read line relative to ground exceeds threshhold of response for the sixth transistor during read addressing of the cell, the fifth transistor charging said external node to potential prior to read addressing of the cell, the node external to the cell being discharged when the sixth transistor is conductive, and circuit means for controlling the voltage of the write line in dependence upon the charge state of the node external to the cell and as established during read addressing of the cell.

18. In a memory as in claim 14, a fourth and a fifth field effect transistor having source-to-drain connected electrodes, the source electrode of the fifths transistor connected to a source of reference potential, the source electrode of the fourth transistor connected to the write line; the sixth transistor operating to establish a charge potential different from ground in the write line prior to each write addressing of the cell; and circuit means connected for copying and logically inverting the copied charge content of the node and applying a corresponding charge to the gate of the fifth transistor.

19. In an integrated circuit memory having a plurality of addresable locations for storage to the word level, a word defined by a plurality of bits, each location to the word level connected to operate in response to read-addressing signals and write-addressing signals, a read addressing signal being provided when read-out of the content of a storage location to the word level is desired, a write-addressing signal being provided when storage of a word in a location to the word level is desired, the memory further responsive to digital addressing signals for addressing a storage location, the memory further operating in response to first phase signals for read control and second phase signals for write control produced in alternating sequence, the combination comprising:

first means respectively pertaining to a memory location of the plurality for providing a logic signal in response to first phase signals and in further response to the digital addressing signals when addressing the location;

a first field effect transistor having a drain electrode connected to receive the first phase signal, having a gate electrode connected to the first means to receive the logic signal and having a source electrode connected to provide a read-addressing signal for the memory location in dependence upon the state of conduction of the first transistor;

a capacitor connected between gate and source electrodes to provide positive feedback;

a second transistor having a drain electrode connected to the source of the first transistor, a gate electrode connected to receive the first phase signals, ahd having a source electrode;

a third transistor having a drain electrode connected to receive the second phase signals, having a gate electrode connected to the source electrode of the second transistor to establish a node therewith charged in dependence upon the state of conduction of the first transistor, and having a source electrode providing the write-addressing signal for the memory; and a capacitor connected between said source and gate electrodes of the third transistor to provide positive feedback.

20. In a memory as in claim 19, the first means including a fourth transistor connected to charge a node as established with the gate of the first transistor in response to each second phase signal, and a fifth transistor responsive to the digital addressing signals and selectively controlling discharge of the node during first phase signals.

21. In an integrated circuit memory as in claim 19, the memory location comprising a plurality of bit cells, each comprising a storage node and a transistor having its gate connected to the storage node; means for causing operating potential applied to the drain electrodes of the transistors in the bit cells in response to a read-addressing signal; a feedback capacitor in each cell connected between the source electrode of the transistor in the cell and the node thereof; and a plurality of data read lines at floating potential respectively connected to the source electrodes of the transistors of the cells, the voltage of the data read lines being controlled in dependence upon the nodes and in response to a read-addressing signal as produced at the time of a first phase signal.

22. In a circuit as in claim 21, each cell including another transistor having source electrode connected to the node in the cell, drain electrode connected to receive data write signal, and having its gate connected to receive the write addressing signal as provided by the third transistor.

23. In a circuit as in claim 19, and including second means connected for operation in parallel to the first means, and coupled to the source electrode of the first transistor to apply non-addressing potential to the memory location connected to receive the read-addressing signal, if the first and second means receive addressing signals different from the ones required for addressing response.

* * * * *